United States Patent
Hsu et al.

(10) Patent No.: US 7,633,781 B2
(45) Date of Patent: Dec. 15, 2009

(54) AC POWER SUPPLY AND METHOD FOR CONTROLLING OUTPUT CURRENT THEREOF

(75) Inventors: Fu-San Hsu, Taipei (TW); Jui-Chin Wu, Taipei (TW)

(73) Assignee: Phoenixtec Power Co., Ltd. (TW)

(*) Notice: Subject to any disclaimer, the term of this patent is extended or adjusted under 35 U.S.C. 154(b) by 280 days.

(21) Appl. No.: 11/788,287

(22) Filed: Apr. 19, 2007

(65) Prior Publication Data

US 2008/0259662 A1  Oct. 23, 2008

(51) Int. Cl.
*H02M 3/24* (2006.01)

(52) U.S. Cl. .......................................... 363/95; 290/1 A

(58) Field of Classification Search ............ 363/34–41, 363/95, 97, 132; 290/1 A, 1 R
See application file for complete search history.

(56) References Cited

U.S. PATENT DOCUMENTS 7,063,454 B2 *  6/2006  Murakami et al. .......... 366/147

* cited by examiner

*Primary Examiner*—Rajnikant B Patel
(74) *Attorney, Agent, or Firm*—Jackson Walker, LLP

(57) ABSTRACT

An AC power supply and a method for dynamically controlling the output current thereof are disclosed. An output voltage stop signal is used to disable a DC/AC converter from outputting. During a period that the DC/AC converter stops its output, the output current of the DC/AC converter is measured and is fed back to a output current control device as an output current feedback signal to produce a deviation. Using the difference between the output current feedback signal of the DC/AC converter and the deviation, an approximate DC value of the output current of the DC/AC converter is calculated. With reference to the approximate DC value, the DC/AC converter can be controlled so that the DC current injection in the output current is approximately zero.

13 Claims, 16 Drawing Sheets

US 7,633,781 B2

AC POWER SUPPLY AND METHOD FOR CONTROLLING OUTPUT CURRENT THEREOF

BACKGROUND OF THE INVENTION

1. Field of the Invention

The invention relates to an AC power supply and a method for dynamically controlling the output current thereof. In particular, the invention relates to a current control method for suppressing the DC current injection and even harmonic in the output current.

2. Description of Related Art

For an AC power supply, the harmonic and the DC current injection inside its output current have to be suppressed. One suppressing method is to use an isolating transformer. However, the drawback is that the isolating transformer will result in some power loss for the AC power supply. Since the isolating transformer is an additional device, it will increase the cost and the volume of the AC power supply.

Another method is shown in FIG. 15, as also disclosed in a German patent, DE 10,249,122. That method can suppress the DC current injection as well. An additional capacitor (Cm) is used as a current detector. According to detecting the voltage across both ends of the capacitor (Cm), an output current feedback signal can be obtained. However, the output current will result in a voltage drop on the capacitor (Cm) due to the charge accumulation effect. To reduce the detection voltage of the capacitor, the capacitor itself has to be a large-capacitance AC capacitor. In that case, the cost and volume are the drawbacks of the AC power supply.

SUMMARY OF THE INVENTION

In view of the fact that the techniques of controlling the DC current injection in the output current are either by adding an isolating transformer or an AC capacitor and result in large volumes and high costs for the AC power supply, this invention provides more efficient solutions for the above-mentioned drawbacks.

One objective of this invention is to provide an AC power supply that detects the DC current injection in its output current, to average the value of the positive and negative cycle of the output current based on the detected DC current injection feedback signal, and controls the DC current injection of the output current to be approximately zero.

To achieve the above objective, the disclosed AC power supply includes:

a DC power source for providing a DC power;

a DC/AC converter for converting a DC power to an AC power;

an output current detector for detecting the output current of the DC/AC converter and generating an output current feedback signal accordingly; and an output current control device for receiving the output current feedback signal and controlling the DC/AC converter; wherein when the output current control device disabling the DC/AC converter by an output voltage stop signal to stop its output power for a while, the output current of the DC/AC converter is detected by the output current detector and fed back to the output current control device for adjusting the output current of the DC/AC converter.

This invention also provides a method for dynamically controlling the output current of an AC power supply. The method includes the steps of:

disabling the DC/AC converter by an output voltage stop signal which is generated by the output current control device to stop its output power for a while;

detecting and obtaining an output current signal from the output current detector and feeding the output current signal back to the current control device; and adjusting the output current by the current control device according to the received feedback current signal to adjust the output current of the DC/AC converter.

BRIEF DESCRIPTION OF THE DRAWINGS

FIG. 4 shows the waveforms of multiple signals at major nodes when the output voltage stop signal $V_{stop}$ turns off the transistor switches of DC/AC converter for a while;

DETAILED DESCRIPTION OF THE PREFERRED EMBODIMENT

Figure 1:
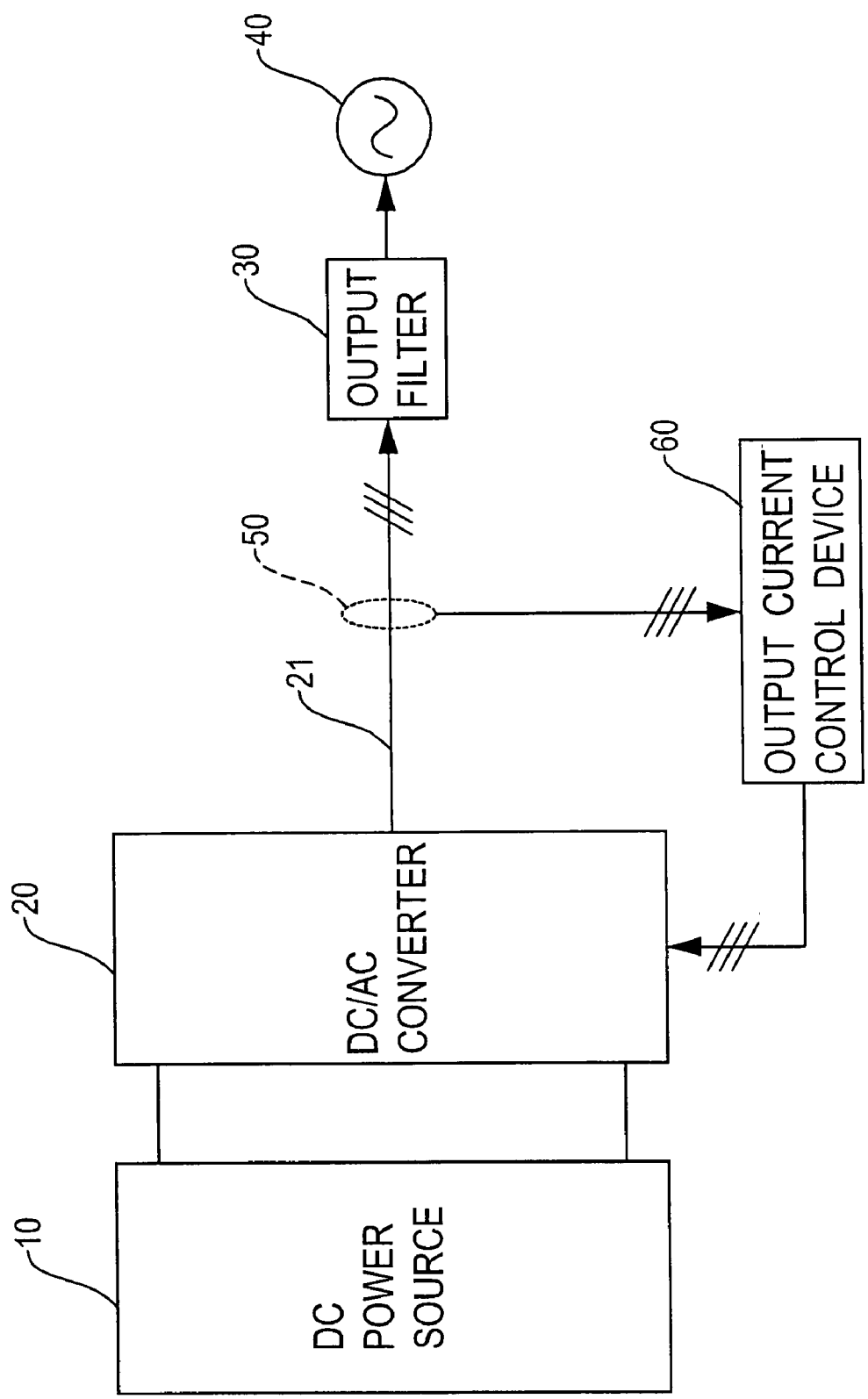
FIG. 1 is a block diagram showing the connection circuit of this invention.

As shown in FIG. 1, a AC power supply device of the present invention comprises a DC power Source 10, a DC/AC converter 20, an output filter 30, an AC load 40, an output current detector 50 and an output current control device 60.

The DC power source 10 can be any type of independent DC power source, a DC generator, or a DC generator with AC/DC conversion for providing DC power.

The DC/AC converter 20 is coupled to the output of the DC power source 10 to convert the DC power to AC power and provide the AC output power via an AC output cable 21.

The output filter 30 is coupled to the output of the DC/AC converter 20 via the AC output line cable 21.

The AC load 40 is coupled to the output of the output filter 30 and can be any type of independent AC load or a utility grid.

The output current detector 50 is coupled between the DC/AC converter and the output filter 30. For example, it can be coupled on the AC output cable 21. By detecting the current on the AC output cable 21, the output current detector 50 generates an output current feedback signal accordingly. The output current detector 50 can be any type of the magnetic coupling element, Hall effect element, or resistor type element.

The output current control device 60 receives the output current feedback signal from the output current detector 50. The output terminal of the output current control device 60 is coupled to the DC/AC converter 20 for adjusting the output current on the AC output cable 21.

Figure 2A:
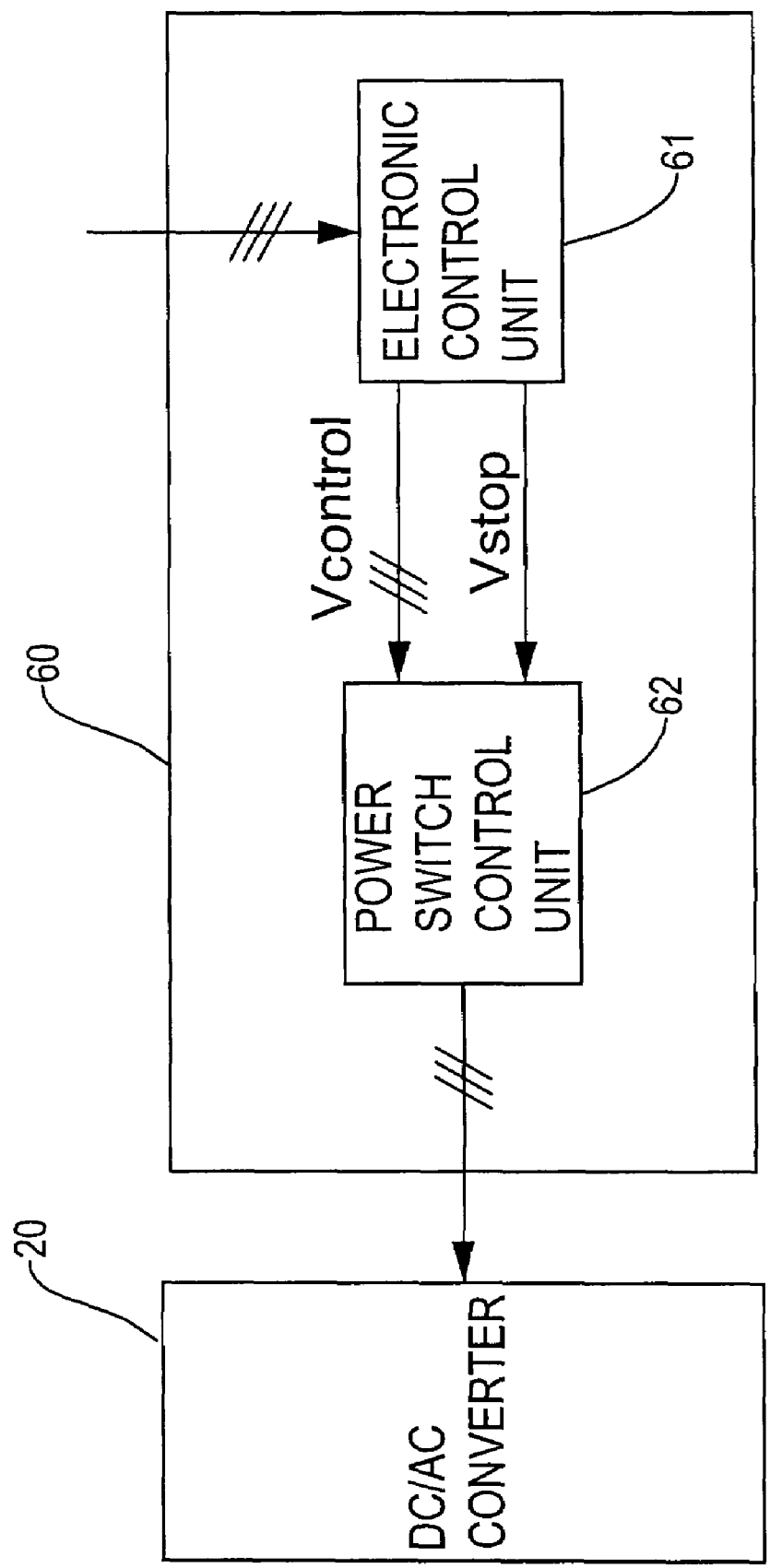
FIG. 2A is a block diagram showing the control units of the output current control device of this invention.

Referring to FIG. 2A, the output current control device 60 comprises an electronic control unit 61 and a power switch control unit 62. The electronic control unit 61 can be a microprocessor, receives the output current feedback signal and generates an output voltage control signal $V_{control}$ and an outputs voltage stop signal $V_{stop}$. The two signals are provided to the power switch control unit 62. The output voltage control signal $V_{control}$ adjusts the output current of the DC/AC converter 20 via the power switch control unit 62. The output voltage stop signal $V_{stop}$ can turn off the transistor switches of the DC/AC converter 20 via the power switch control unit 62.

Figure 3:
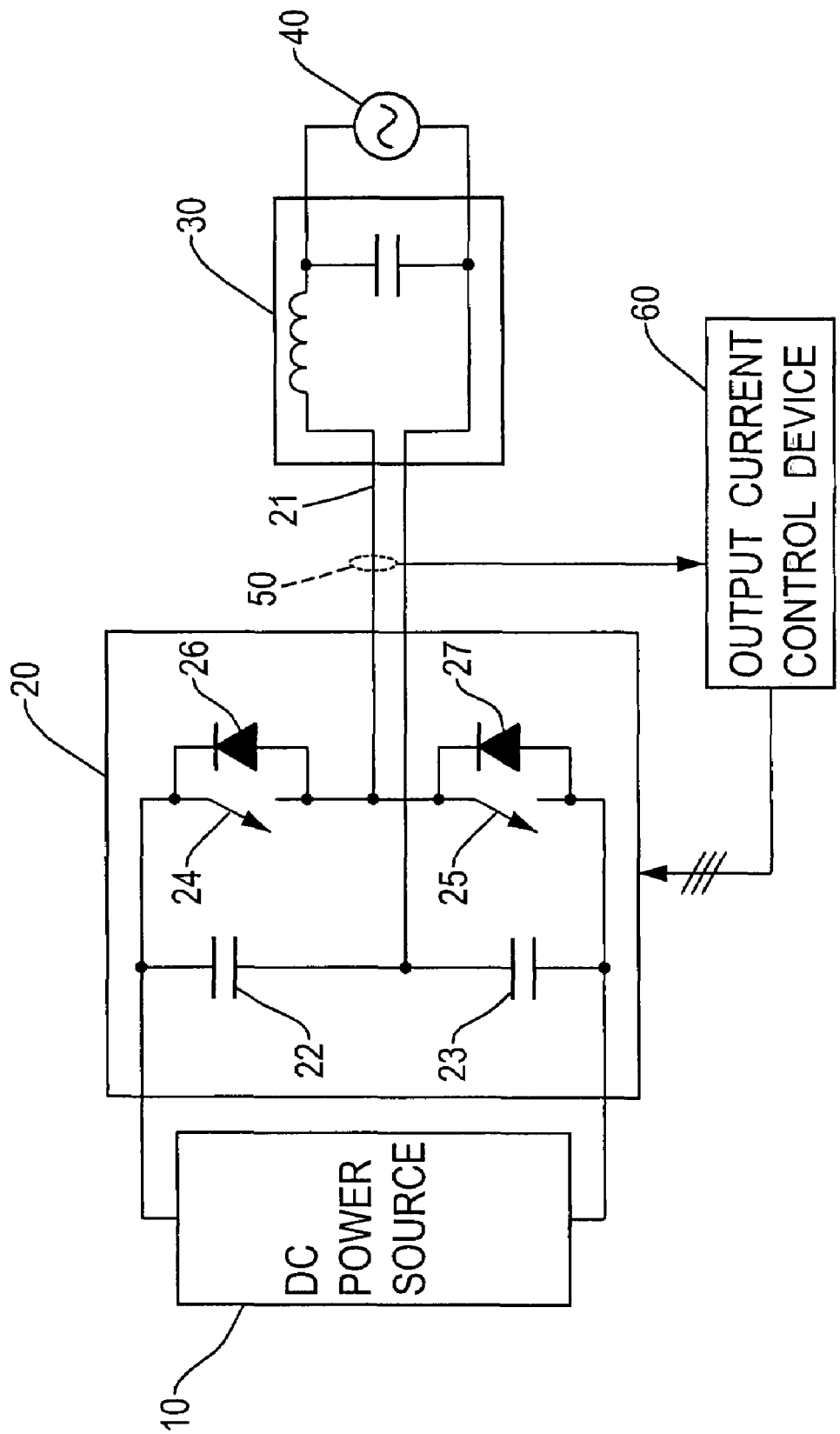
FIG. 3 is a circuit diagram showing a first embodiment of the circuit connection of the DC/AC converter of this invention.

Referencing to FIG. 3, the first embodiment of the DC/AC converter 20 has two capacitors 22, 23 connected in series and two transistor switches 24, connected in series. The series-connected capacitors 22, 23 and the series-connected transistor switches 24, 25 are connected in parallel. The node between the two capacitors 22, 23 and the node between the two transistor switches 24, 25 are respectively connected to the two input terminals of the output filter 30. Diode 26 is placed across transistor 24, and diode 27 is placed across transistor 27.

Figure 2B:
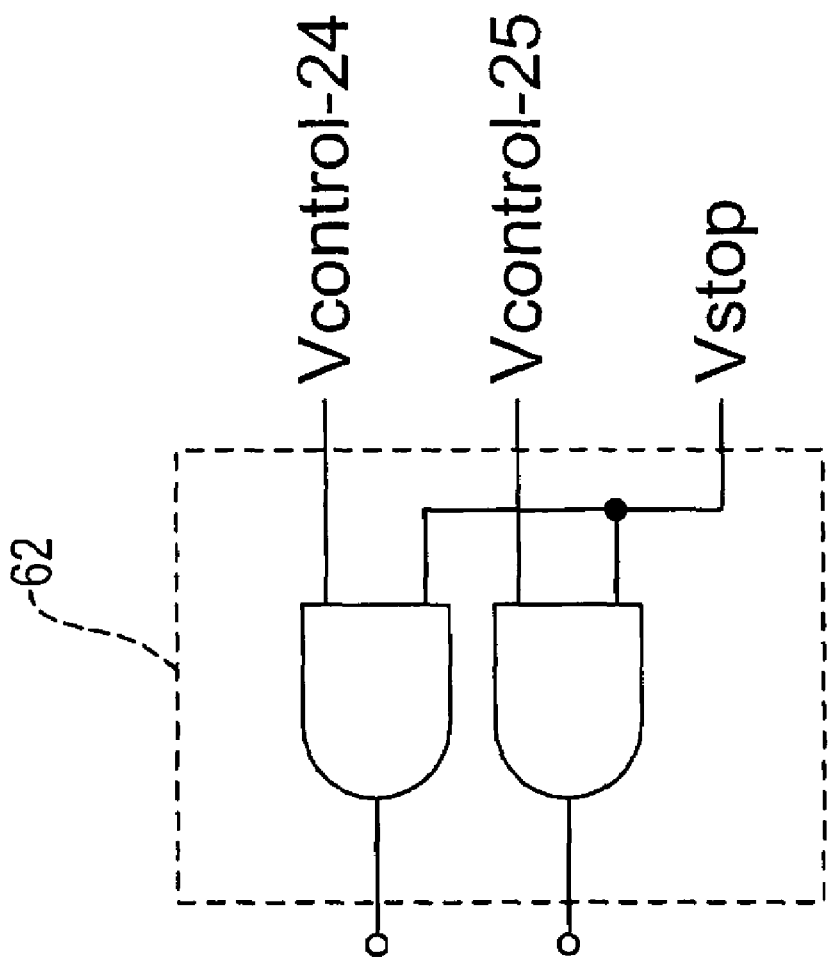
FIG. 2B is a circuit diagram showing an embodiment of the power switch controlling unit of the DC/AC converter of this invention.

An embodiment of the power switch control unit 62 is shown in FIG. 2B. This embodiment corresponds to the structure of the DC/AC converter 20 of FIG. 3. The power switch control unit 62 mainly comprises two 2-input AND gates. Each AND gate has two input terminals. The first input terminals of the two AND gates respectively receive the output voltage control signals $V_{control-24}$ and $V_{control-25}$ from the electronic control unit 61. The second input terminals of the two AND gates receive the output voltage stop signal $V_{stop}$. The output terminals of the AND gates output two control signals, respectively, for controlling the OFF/ON of the transistor switches 24, 25.

Figure 4:
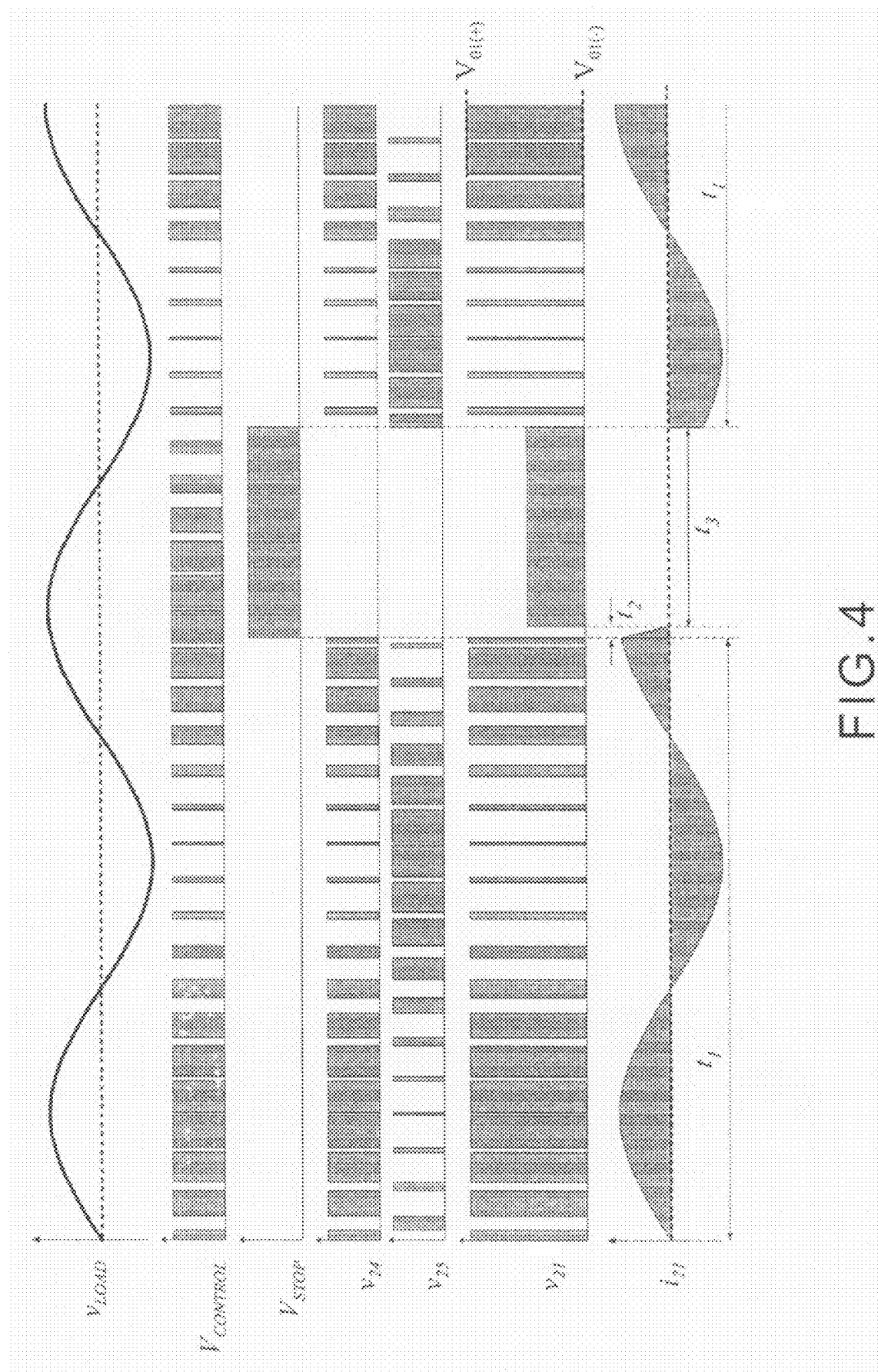

FIG. 4 shows the waveforms of voltages at major nodes when the output voltage stop signal $V_{stop}$ turns off the transistor switches 24, 25. From top to bottom, the meaning of each waveform is described as follows:

$v_{LOAD}$: the voltage on the AC load 40;

$V_{control}$: the waveform of the output voltage control signal $V_{control}$;

$V_{stop}$: the waveform of the output voltage stop signal $V_{stop}$;

$v_{24}$: the waveform of the control signal for the transistor switch 24;

$v_{25}$: the waveform of the control signal for the transistor switch 25, complementary to the control signal $v_{24}$;

$v_{21}$: the waveform of the output voltage detected on the AC output cable 21; and $i_{21}$: the waveform of the output current measured on the AC output cable 21.

The output voltage stop signal $V_{stop}$ can act at any time. Once the output voltage stop signal $V_{stop}$ exists, the output signal of the output current control device 60 stops. This means that the control signals $v_{24}$, $v_{25}$ for the transistor switches 24, 25 will be stopped.

The actual action of the output voltage stop signal $V_{stop}$ has two stages $t_2$ and $t_3$. In the stage of $t_2$, the output current $i_{21}$ of the DC/AC converter 20 is nonzero. However, the transistor switches 24, 25 are open. The diodes 26, 27 and the capacitors 22, 23 form an equivalent clamping circuit. The output voltage $v_{21}$ of the DC/AC converter 20 becomes a DC positive voltage $V_{01(+)}$ or a DC negative voltage $V_{01(-)}$. The output current $i_{21}$ is forced to become zero. Once the output current $i_{21}$ becomes zero, it enters the third stage $t_3$, and the output voltage $v_{21}$ in the stage of $t_3$ departs from the clamping state. By checking whether the output voltage $v_{21}$ departs from the clamping state or not, it is possible to determine whether the output current $i_{21}$ is discharged to zero or not.

Figure 5:
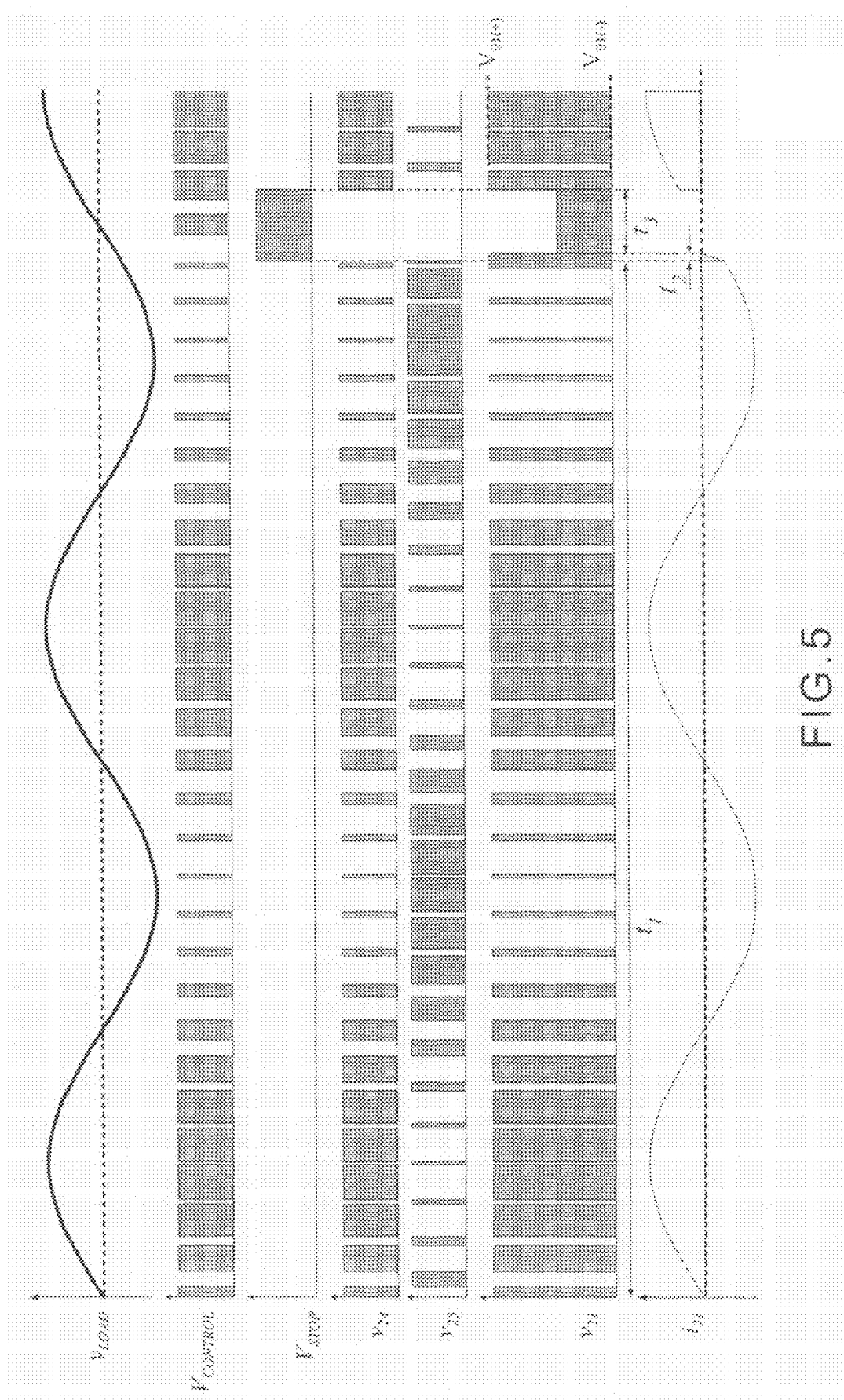
FIG. 5 shows the waveforms of multiple signals at major nodes when the output voltage stop signal turns off the transistor switches of DC/AC converter while the output voltage $v_{LOAD}$ is at the zero cross point of the positive edge.
Figure 6:
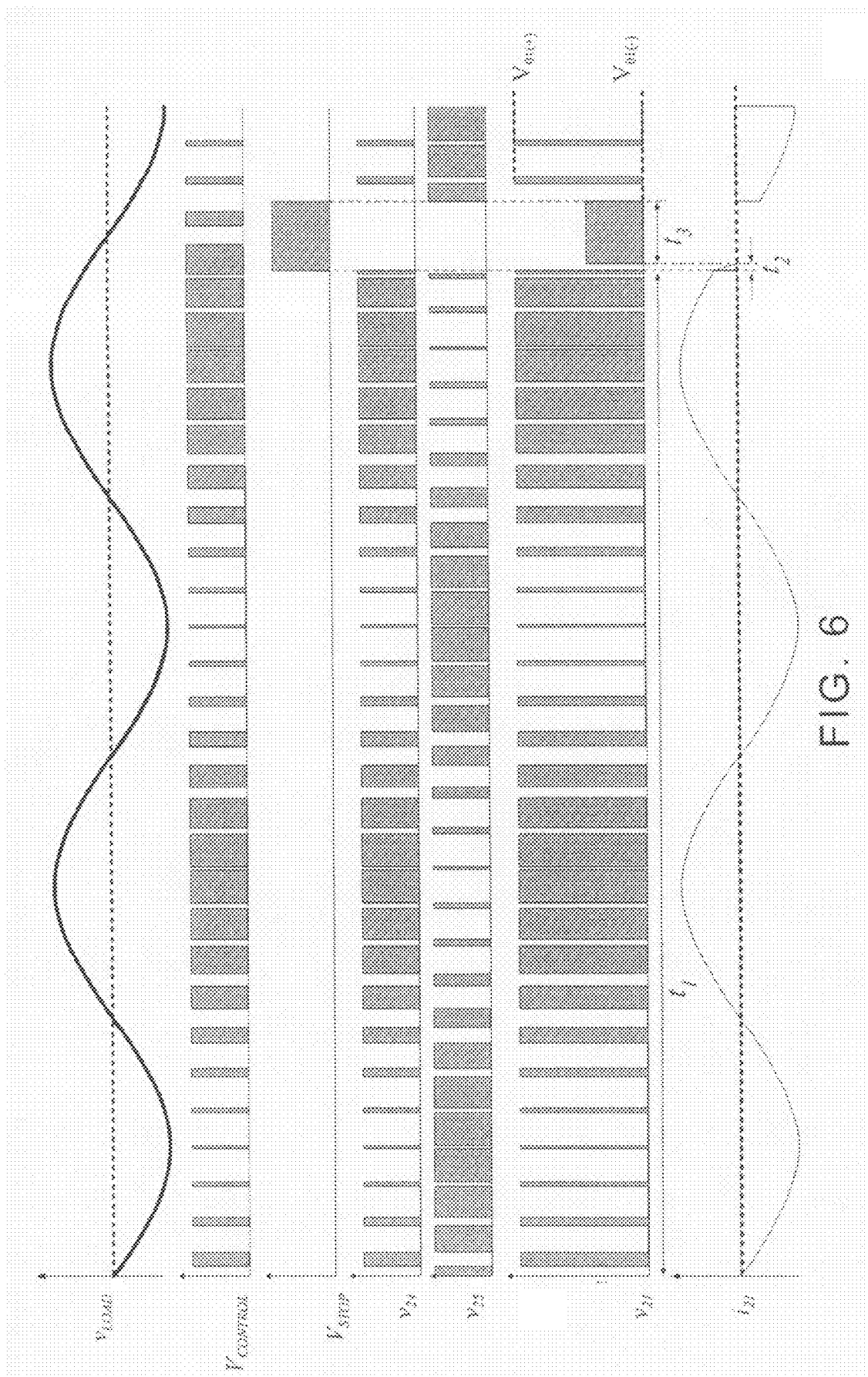
FIG. 6 shows the waveforms of multiple signals at major nodes when the output voltage stop signal turns off the transistor switches of DC/AC converter while the output voltage $v_{LOAD}$ is at the zero cross point of the negative edge.

FIGS. 5 and 6 respectively show the waveforms of the voltages at major nodes when the output voltage stop signal $V_{stop}$ turns off the transistor switches 24, 25 as the output AC load voltage $v_{LOAD}$ is at the zero cross point of positive edge and negative edge. The harmonic in the output current $i_{21}$ can be effectively reduced due to the action period of the output voltage stop signal $V_{stop}$ crossing the zero cross point.

Even the output current $i_{21}$ actually becomes zero, the output current detector 50 may still detect an existent output current that is regarded as the deviation $i_{21}*$. As described above, detecting the output voltage $v_{21}$ during the action period of the output voltage stop signal $V_{stop}$, while the condition that the output voltage $v_{21}$ is not clamped to be the DC positive voltage $V_{01(+)}$ or the DC negative voltage $V_{01(-)}$, it is used as the basis for the output current $i_{21}$ to be zero. Under this condition, the output current feedback signal can be detected as the deviation $i_{21}*$ of the output current detector 50.

Figure 7:
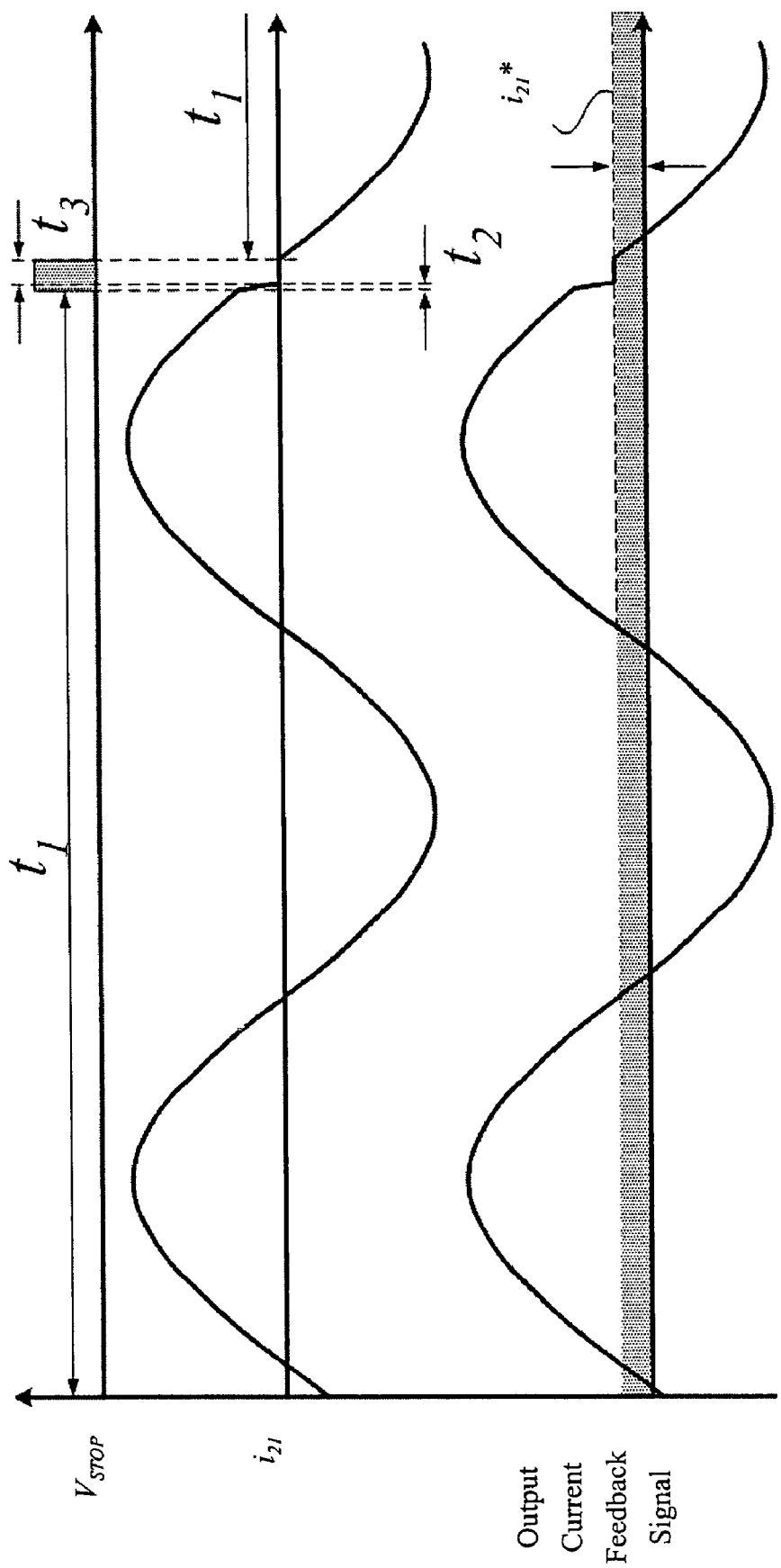
FIG. 7 is a scheme of the DC current injection $i_{21}$* detecting by the output current detector of this invention.

FIG. 7 shows the waveform for obtaining the deviation $i_{21}*$. As the output voltage stop signal $V_{stop}$ acts, the transistor switches 24, 25 of the DC/AC converter 20 become open. In this case, the output current feedback signal of the output current detector 50 is read as the deviation $i_{21}*$. The calculation of the deviation $i_{21}*$ can be achieved during the anti-islanding detection period. It is known that the active anti-islanding method can be achieved using the active frequency drift method. The details of the anti-islanding protection can be found in the following two references:

1. H. Kobayashi et al., "Method For Preventing Islanding Phenomenon On Utility Grid With A Number of Small Scale PV Systems," 22 IEEE Photovoltaic Specialists Conference, Vol. 1, pp. 695-700, 1991。

2. M. E. Ropp, M. Begovic, and A. Rohatgi, "Analysis and performance assessment of the active frequency drift method of islanding prevention," IEEE Trans. on Energy Conversion, Vol. 14, pp. 810-816, 1999。

Since the deviation $i_{21}*$ is extracted during the working period of the output voltage stop signal $V_{stop}$, the deviation $i_1*$ represents the difference between the actual value and feedback value of the output current $i_{21}$. Therefore, the actual value of the output current $i_{21}$ can be calculated by subtracting the deviation $i_{21}*$ from the output current $i_{21}$ which measured in the normal period.

Figure 8:
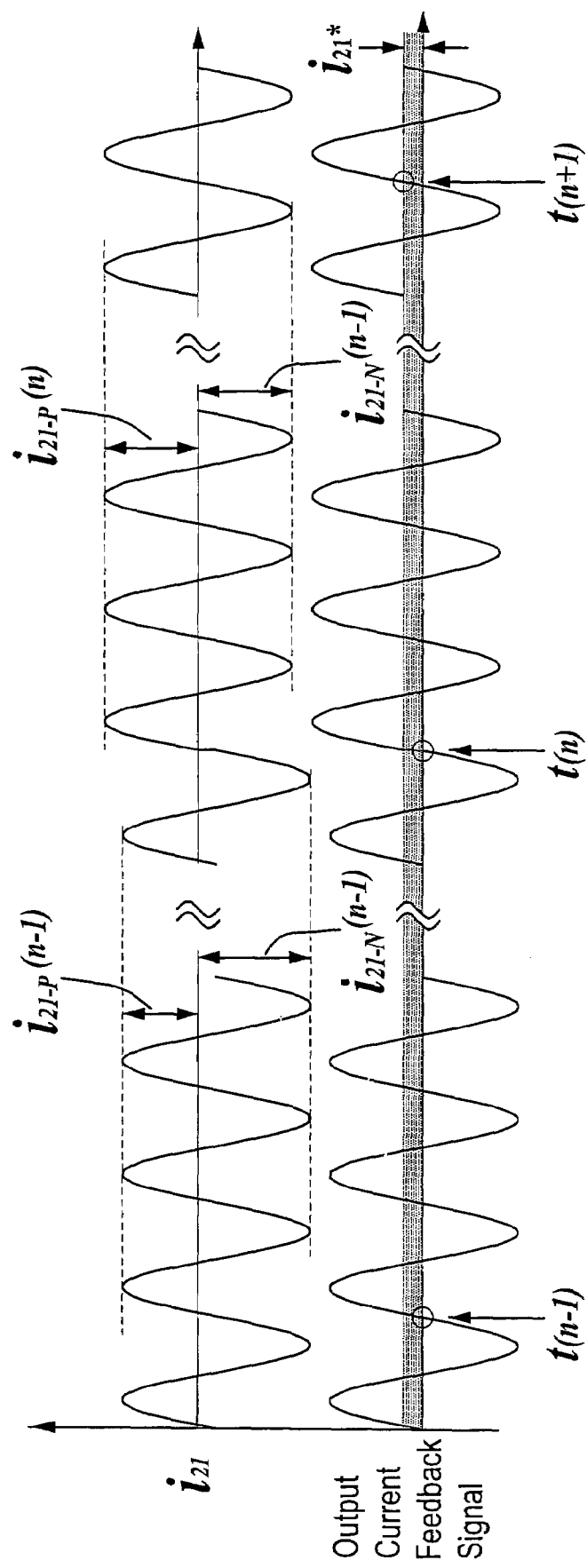
FIG. 8 is a scheme of computing and reducing the DC current injection in the output current.

FIG. 8 explains how to use the current output control device 60 to calculate the DC current injection of the output current $i_{21}$ and how to reduce the DC current injection of the output current $i_{21}$. In this embodiment, the DC current injection of the output current $i_{21}$ in the period of t(n−1)~t(n) is calculated, and the DC current injection of the output current $i_{21}$ in the period of t(n)~(n+1) is reduced.

1. In the period of t(n−1)~t(n), the actual DC current injection $i_{21(DC)}$ of the output current $i_{21}$ is represented by the following integral equation (1)

$$i_{21(DC)} = \int_{t(n-1)}^{t(n)} \frac{i_{21}(t)}{t(n) - t(n-1)} dt \quad (1)$$

After the subtracting the mentioned deviation $i_{21}*$ of the output current detector 50, the actual DC current injection $i_{21(DC)}$ approximates to an approximate DC value $i_{21(DC)}\hat{}$ that is caculated from the following integral equation (2). In particular, $i_{21\_(Feedback)}$ is the output current feedback signal of the output current detector 50.

$$i_{21(DC)} \approx i_{21(DC)}\hat{} \equiv \int_{t(n-1)}^{t(n)} \frac{i_{21(Feedback)} - i_{21}*}{t(n) - t(n-1)} dt \quad (2)$$

In particular, the disclosed output current control device 60 calculates the approximate DC value $i_{21(DC)}\hat{}$, the period between the beginning time and ending time for each accumulation is an integral period. For example, the interval between t(n−1) and t(n) or between t(n) and t(n+1) is an integral period.

II. In the period of t(n)~t(n+1), the approximate DC value $i_{21(DC)}\hat{}$ of the actual DC component $i_{21(DC)}$ is given by equation (2). Therefore, the approximate DC value $i_{21(DC)}\hat{}$ can be used to compensate the deviation $i_{21}*$ of the output current detector 50. This can be used to control the DC/AC converter to average the value of the output current $i_{21}$ in the positive and negative cycle of the period t(n)~t(n+1). Thus, the DC current injection of the output current $i_{21}$ in the period of t(n)~t(n+1) is approximately zero. For example, the DC current injection of the output current $i_{21}$ shown in FIG. 8 is a negative value during the period of t(n−1)~t(n), meaning that a peak value $i_{21-N(n-1)}$ in the negative cycle of the output current $i_{21}$ is greater than a peak value $i_{21-P(n-1)}$ in the positive cycle. The compensation method can choose to either increase the peak value $i_{21-P(n)}$ in the positive cycle or reduce the peak value $i_{21N-(n)}$ in the negative cycle during the period of t(n)~t(n+1).

Figure 9:
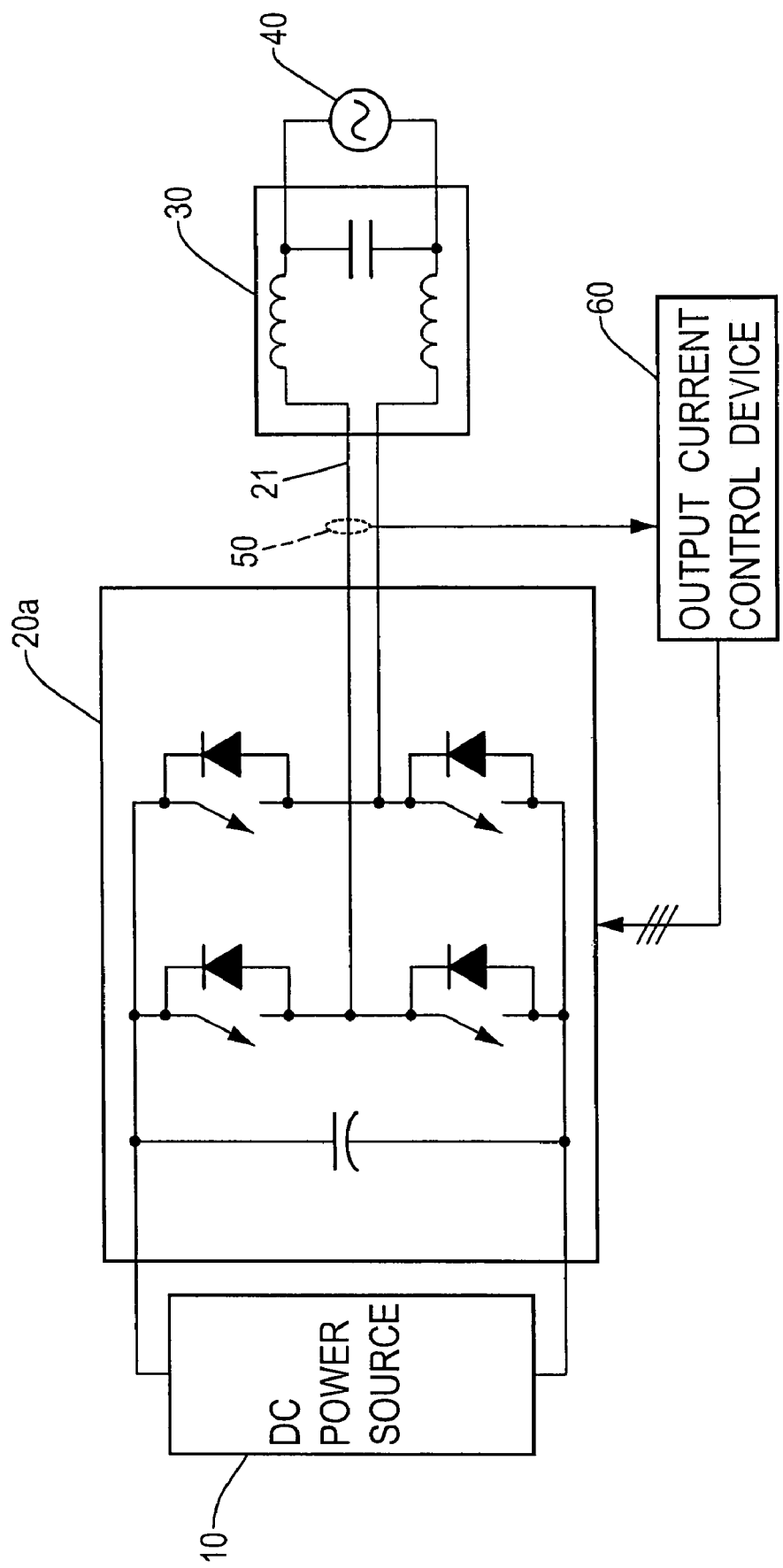
FIG. 9 is a circuit diagram showing a second embodiment of the circuit connection of the DC/AC converter of this invention.
Figure 10:
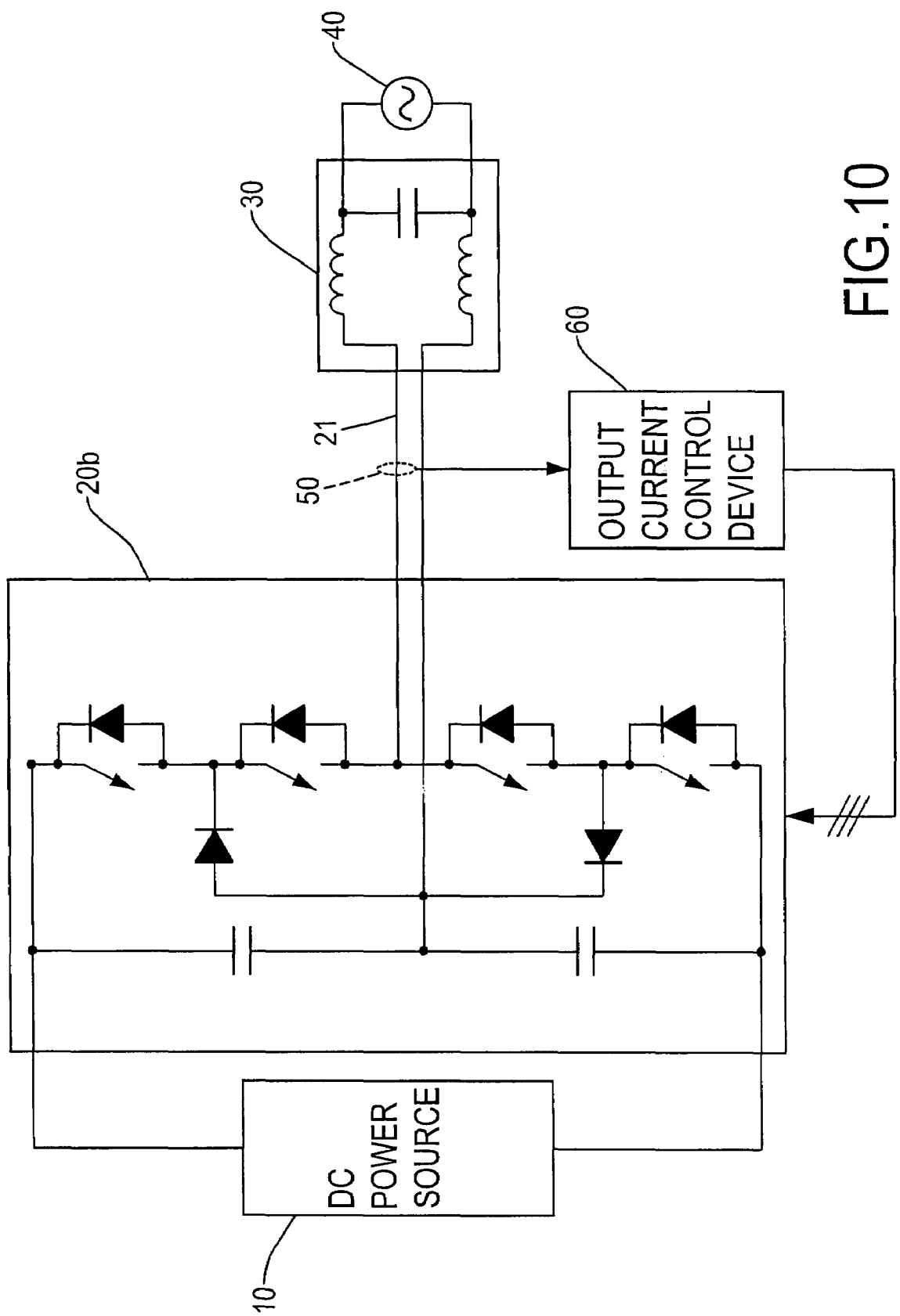
FIG. 10 is a circuit diagram showing a third embodiment of the circuit connection of the DC/AC converter of this invention.
Figure 11:
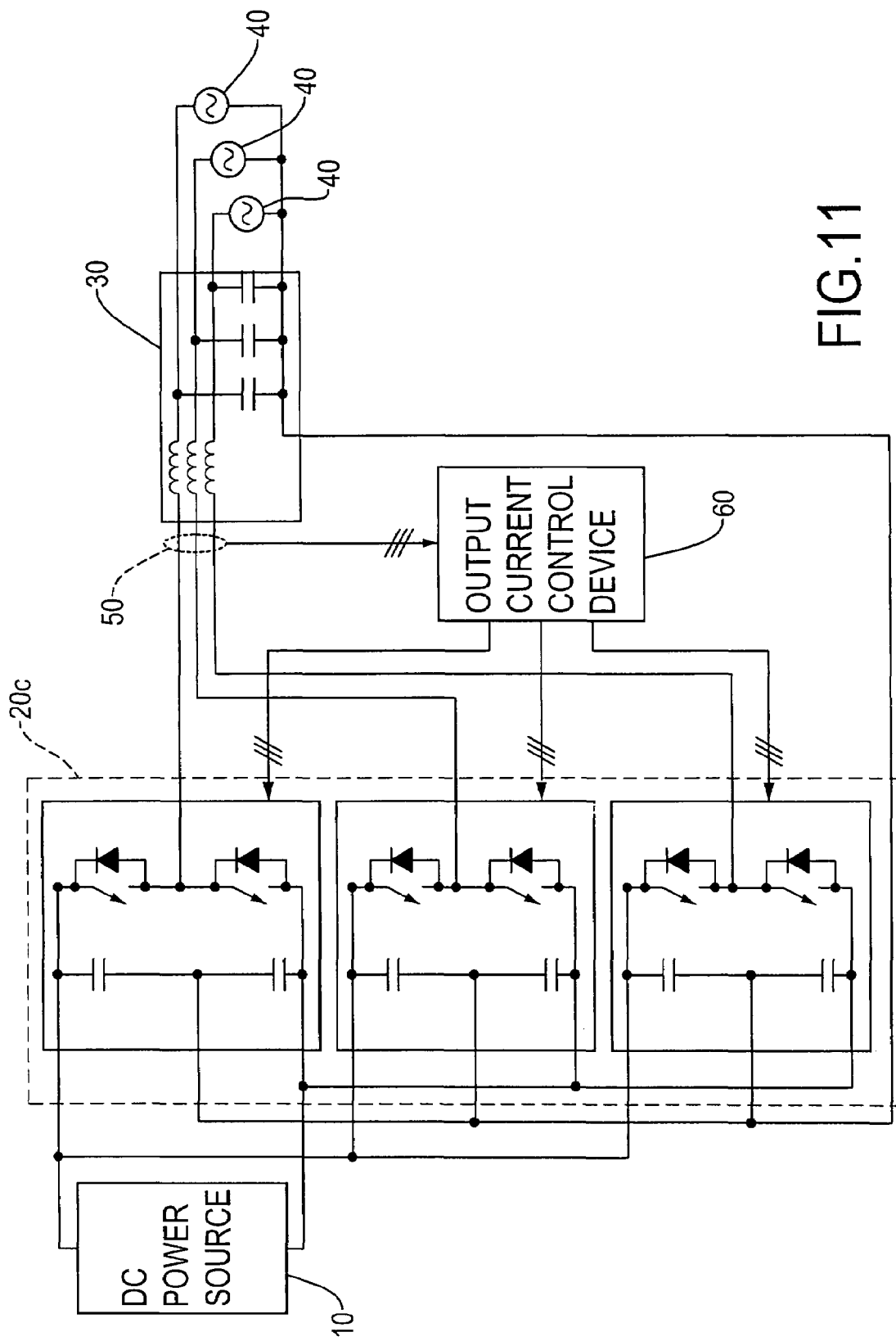
FIG. 11 is a circuit diagram showing a fourth embodiment of the circuit connection of the DC/AC converter of this invention.
Figure 12:
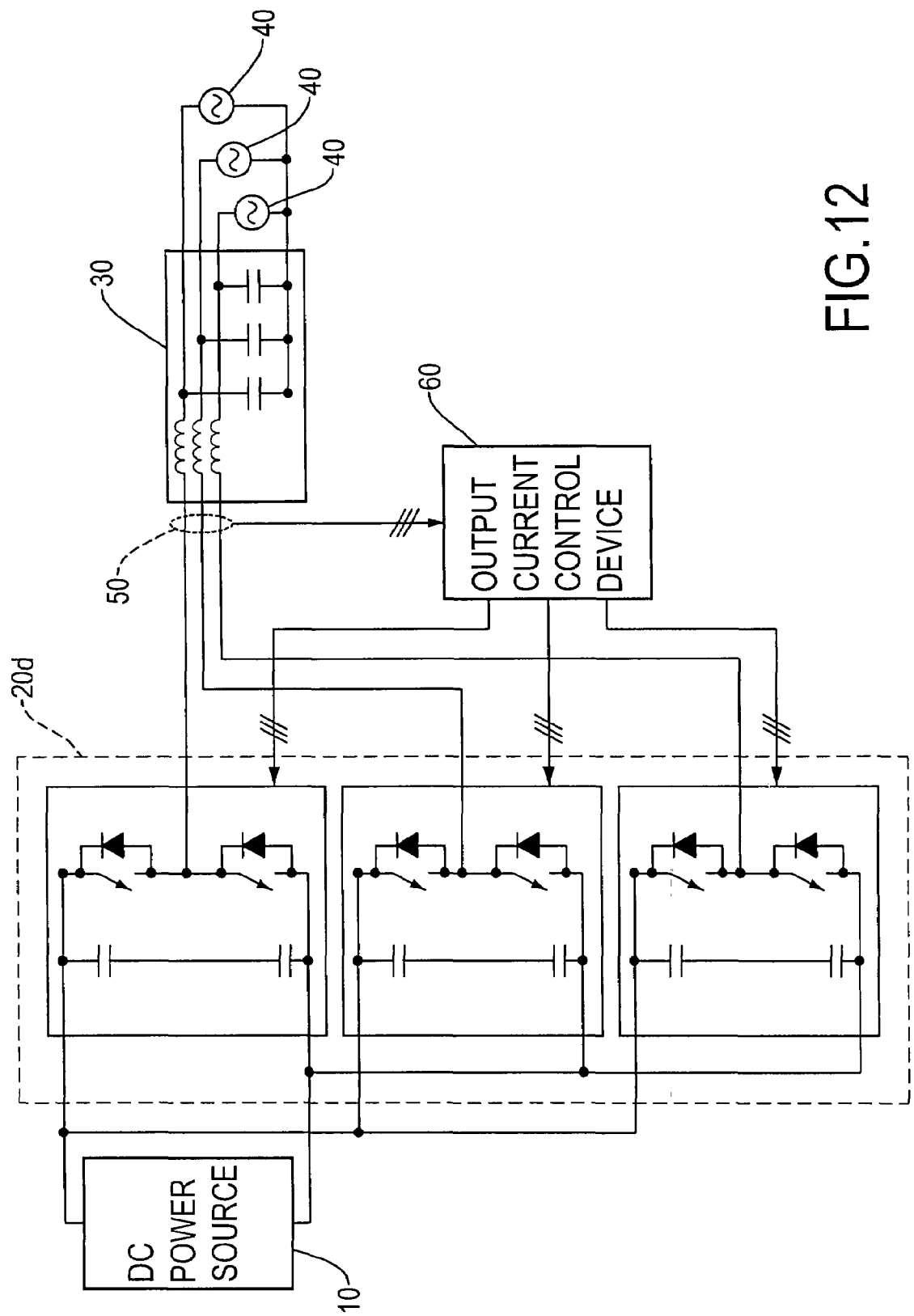
FIG. 12 is a circuit diagram showing a fifth embodiment of the circuit connection of the DC/AC converter of this invention.

FIGS. 9 and 10 show another two embodiments of the DC/AC converters 20a, 20b. They are modifications of the DC/AC converter 20 shown in FIG. 3 and can be used in the invention as well. The DC/AC converter 20c in FIG. 11 is a 3-phase-4-line converting circuit. It can be regarded as composed of three sets of single-phase DC/AC converter 20. The DC/AC converter 20d in FIG. 12 is a 3-phase-3-line system modified from the 3-phase-4-line structure of FIG. 11.

Figure 13:
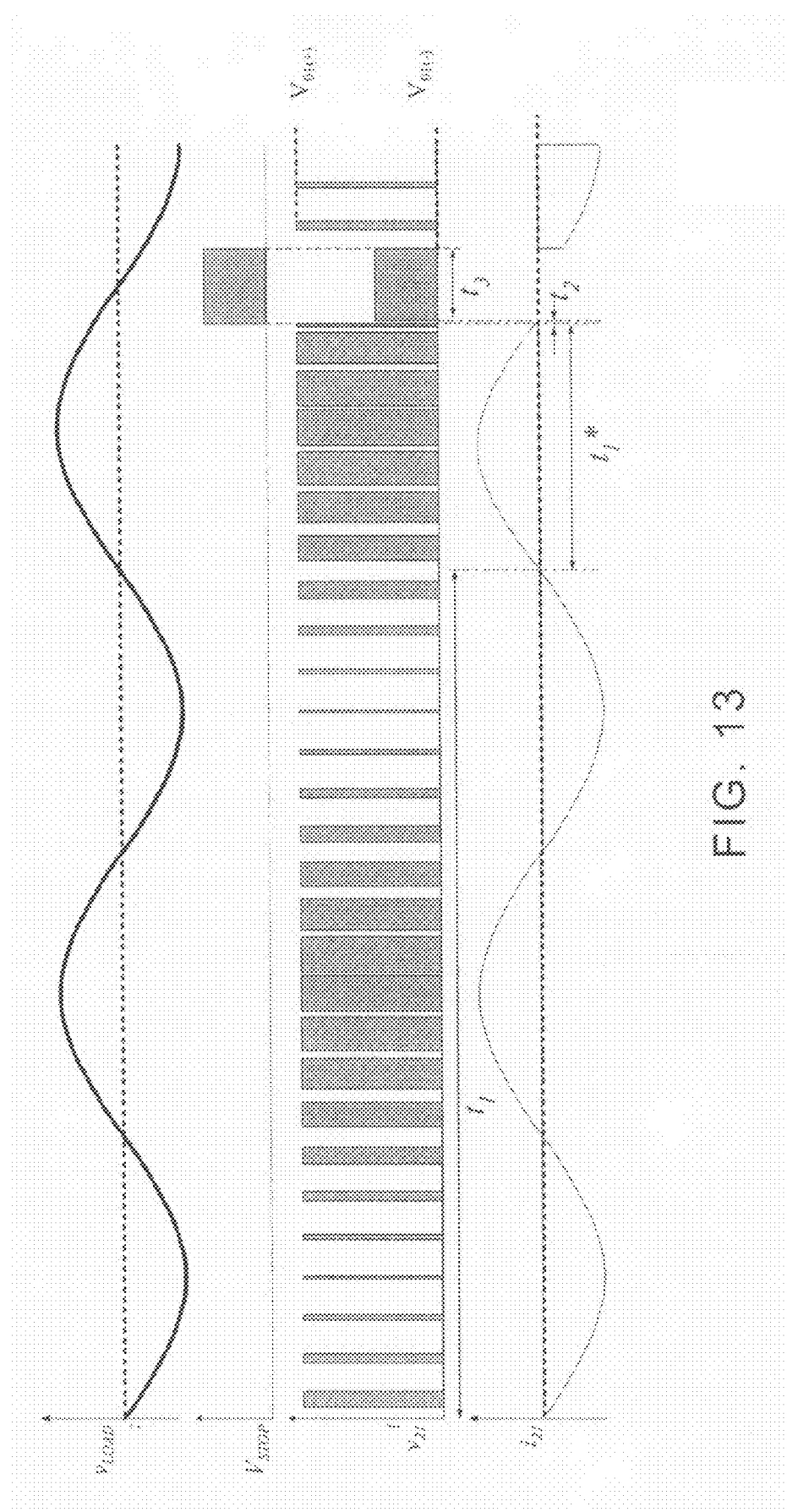
FIG. 13 shows the waveform according to a first controlling method of this invention in which the output voltage stop signal $V_{stop}$ pre-zeros the output current.

FIG. 13 shows another way of measuring the deviation $i_{21}*$ according to this invention. In the period of t1, the AC load voltage $v_{LOAD}$ has the same frequency and the same phase as the output current $i_{21}$ of the DC/AC converter 20. Before the output voltage stop signal $V_{stop}$ acting, the output current control device 60 slightly increases the frequency of the output current $i_{21}$ during the period of $t_1*$ as the scheme showing. The output current $i_{21}$ is thus able to approach the zero potential faster than the AC load voltage $v_{LOAD}$. Therefore, when the output voltage stop signal $V_{stop}$ starts, the output current $i_{21}$ during the period of $t_2$ is quite small. In the period of $t_3$, it completely becomes zero. As a consequence, when the output voltage stop signal $V_{stop}$ ends, the initial value of the output current $i_{21}$ is not too large. Therefore, when measuring the deviation $i_{21}*$, the harmonic of the output current $i_{21}$ does not affect too much on the measuring result.

Figure 14:
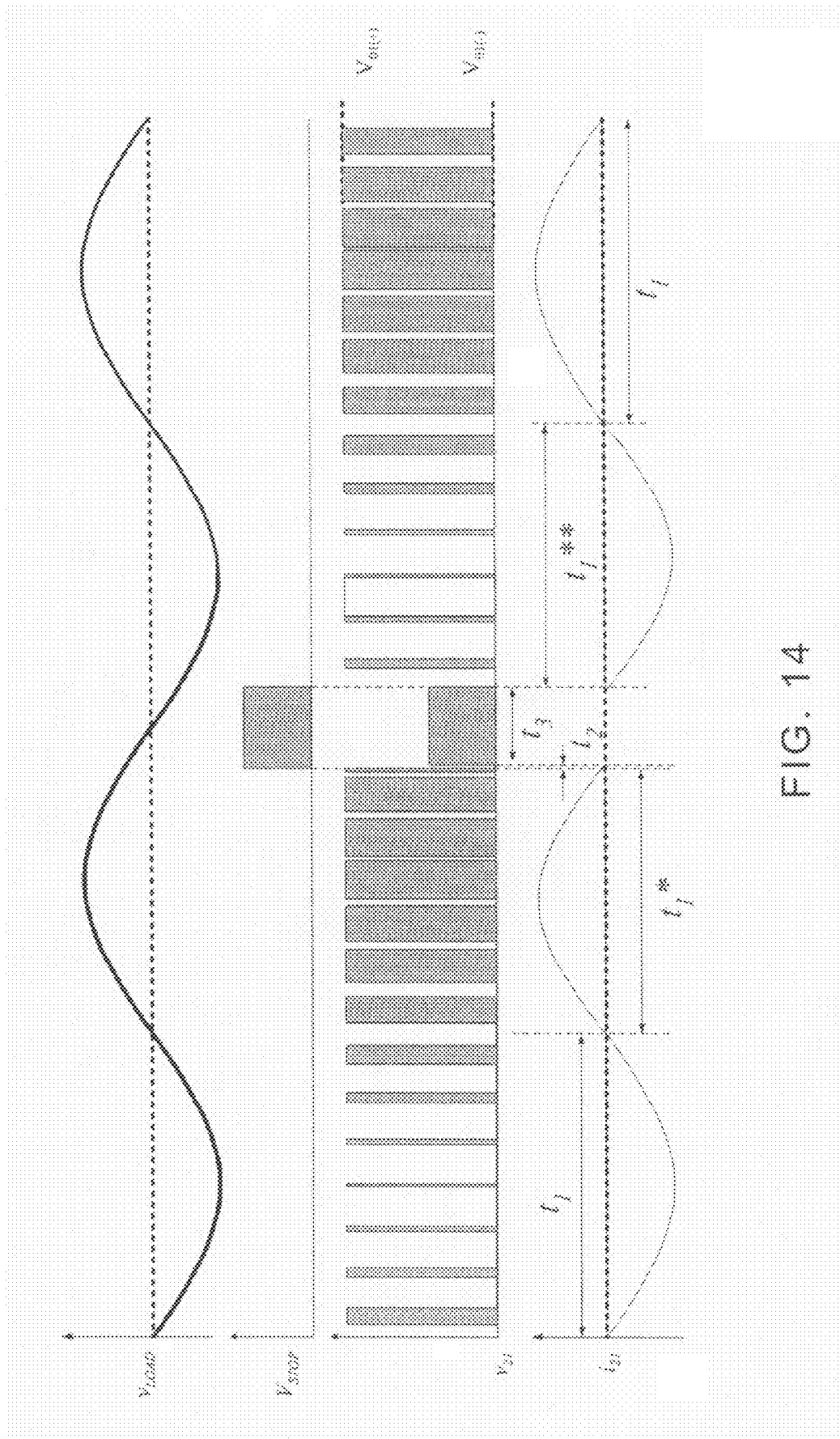
FIG. 14 shows the waveform according to a second controlling method in which the output voltage stop signal $V_{stop}$ pre-zeros the output current.
Figure 15:
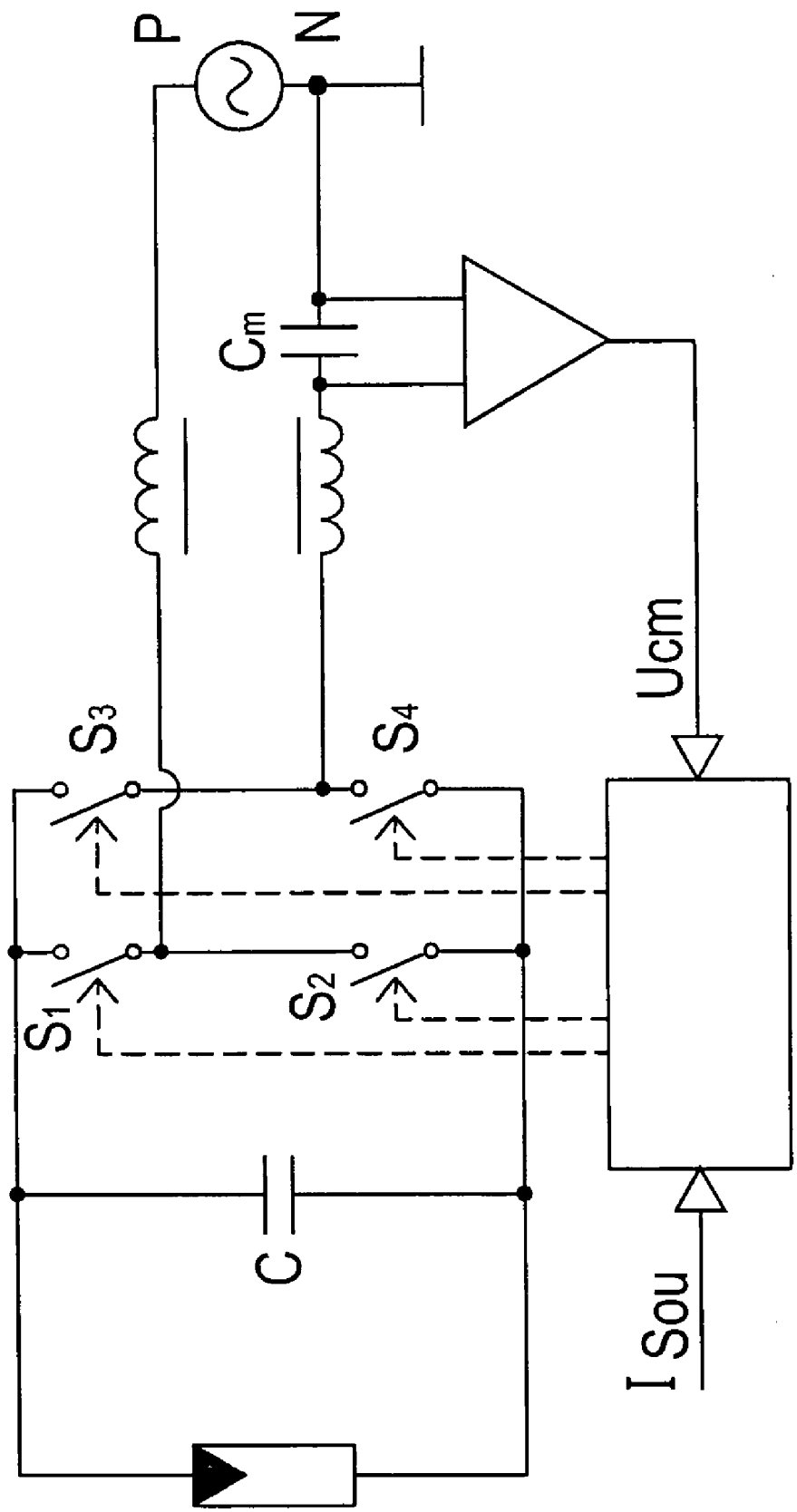
FIG. 15 shows a circuit of a prior art AC power supply disclosed in a German published application, DE 10249122.

FIG. 14 shows yet another method of measuring the deviation $i_{21}*$. It is similar to that in FIG. 13, by adjusting the frequency of the output current $i_{21}$. Explicitly, the output voltage stop signal $V_{stop}$ is designed to be at the zero cross point on the negative edge of the AC load voltage $v_{LOAD}$. The frequency of the output current $i_{21}$ is adjusted during a complete cycle of the AC load voltage $v_{LOAD}$ so that the half period $t_1*$ of the output current $i_{21}$ is shorter than the original half period $t_1$. As a result, the output current $i_{21}$ approaches the zero potential at a faster speed. Therefore, once the output voltage stop signal $V_{stop}$ starts, it only takes an extremely short transient time $t_2$ to be the completely zero voltage level at $t_3$. At the moment the output voltage stop signal $V_{stop}$ stops, the initial value of the output current $i_{21}$ increases from the zero voltage level. Therefore, the harmonic in the output current $i_{21}$ can be effectively suppressed, so that the measurement of the deviation $i_{21}*$ can be more accurate.

The above-mentioned integral calculation method is only an example. Other well-known methods, such as the Weighted Average Method, the Moving Average Method, and the Moving Weighted Average Method, can be used to calculate the approximate DC value as well.

In summary, using this invention to control the output current of the AC power supply does not require any additional large-volume transformer or AC capacitor. Therefore, it is a great improvement in the overall volume and production cost of the AC power supply. Moreover, the usual current detector has variable deviations and a usual compensation method is to take a feedback current as the deviation and subtract it before starting the DC/AC converter. However, once the entire AC power supply operates, the actual deviation may be different from the initial one due to the interference of temperature, magnetic field, and so on. The result is that the DC current injection of the output current cannot be effectively adjusted to approximately zero. The invention can dynamically calculate the approximate DC current injection of the AC output current, and appropriately average the value of the positive/negative cycle of the AC output current with reference to the approximate DC value. Therefore, the DC current injection of the AC output current can be effectively suppressed to nearly zero, providing better AC power.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An AC power supply comprising:
   a DC power source providing a DC power;
   a DC/AC converter converting a DC power to an AC power;
   an output current detector detecting an output current of the DC/AC converter and generating an output current feedback signal accordingly;
   an output current control device receiving the output current feedback signal, disabling the DC/AC converter to temporarily interrupt output power, controlling the output current detector to detect an existent output current of the DC/AC converter as a current deviation, and adjusting the output current of the DC/AC converter by using the current deviation; and an output filter connected to an output of the DC/AC converter via an AC output cable, and the output current detector being coupled to the AC output cable.

2. The AC power supply as claimed in claim 1, wherein the DC power source is chosen from a group consisting of an independent DC power supply, a DC generator or a DC generator with AC/DC conversion.

3. The AC power supply as claimed in claim 1, wherein the output current control device refers to an output current feedback signal from the output current detector to calculate an approximate DC value, and uses the approximate DC value to adjust the output current of the DC/AC converter so that the DC current injection in the output current is approximately zero.

4. The AC power supply as claimed in claim 1, wherein the output current control device disables the DC/AC converter by generating an output voltage stop signal.

5. The AC power supply as claimed in claim 1, wherein when the output voltage of the DC/AC converter is not equal to a DC positive voltage or a DC negative voltage, the output current of the DC/AC converter is detected and is fed back to the output current control device.

6. The AC power supply as claimed in claim 3, wherein a period between a starting time and a finishing time used for processing and obtaining the approximate DC value is an integral period.

7. The AC power supply as claimed in claim 1, wherein the output current control device comprises an electronic control unit and a power switch control unit.

8. A method for controlling the output current of an AC power supply, the method comprising the steps of:

disabling a DC/AC converter by an output voltage stop signal generated by an output current control device to temporarily interrupt output power;

detecting the output current of the DC/AC converter temporarily disabled as a current deviation by the output current detector; and detecting the output current of the DC/AC converter operated normally as an output current feedback signal by an output current detector and feeding the output current feedback signal back to the current control device; and adjusting the output current of the DC/AC converter by the current control device according to the received output current feedback signal and the current deviation.

9. The method as claimed in claim 8, wherein the output current control device refers to the current deviation from the output current detector to calculate an approximate DC value, and uses the approximate DC value to adjust the output current of the DC/AC converter so that the DC current injection of the output current is approximately zero.

10. The AC power supply as claimed in claim 8, wherein when the output voltage of the DC/AC converter is not equal to the DC positive voltage or the DC negative voltage, the output current of the DC/AC converter is detected as the current deviation and is fed back to the output current control device.

11. The method as claimed claim 9, wherein a period between a starting time and a finishing time used for processing and obtaining the approximate DC value is an integral period.

12. The method as claimed in claim 10, wherein a frequency of the output current of the DC/AC converter is adjusted before the output voltage stop signal starting so that the output current approaches a zero current level in advance.

13. The method as claimed in claim 10, wherein a frequency of the output current of the DC/AC converter is adjusted before the output voltage stop signal starting so that the output current approaches a zero current level in advance and the initial value of the output current starts from the zero potential when the output voltage stop signal finishes.

* * * * *